(12) United States Patent
Chi

(10) Patent No.: US 11,586,350 B2
(45) Date of Patent: Feb. 21, 2023

(54) TOUCH-SENSING DISPLAY APPARATUS AND CURSOR CONTROLLING METHOD THEREOF

(71) Applicant: BENQ CORPORATION, Taipei (TW)

(72) Inventor: Chin-Jui Chi, Taipei (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 17/496,892

(22) Filed: Oct. 8, 2021

(65) Prior Publication Data

US 2022/0164099 A1 May 26, 2022

(30) Foreign Application Priority Data

Nov. 24, 2020 (CN) .......................... 202011324969.6

(51) Int. Cl.
*G06F 3/04883* (2022.01)
*G06F 3/041* (2006.01)
*G06F 3/04812* (2022.01)

(52) U.S. Cl.
CPC ........ *G06F 3/04883* (2013.01); *G06F 3/0412* (2013.01); *G06F 3/04812* (2013.01)

(58) Field of Classification Search
CPC .. G06F 3/0812; G06F 3/04883; G06F 3/0488; G06F 3/03547; G06F 3/0486; G06F 3/041–04886; G06F 2203/041–04114
See application file for complete search history.

(56) References Cited

U.S. PATENT DOCUMENTS

| 9,684,521 B2 | 6/2017 | Shaffer et al. |
| 2012/0044164 A1 | 2/2012 | Kim et al. |
| 2014/0160073 A1* | 6/2014 | Matsuki ............ G06F 3/04886 345/173 |
| 2016/0253042 A1* | 9/2016 | Niwa ................ G06F 3/04883 345/157 |
| 2016/0334911 A1* | 11/2016 | Kimura ............. G06F 3/0412 |
| 2019/0220167 A1* | 7/2019 | Cho .................. G06F 3/04883 |

FOREIGN PATENT DOCUMENTS

| CN | 101593060 A | 12/2009 |
| CN | 102981727 B | 1/2016 |
| TW | 200928905 A | 7/2009 |
| TW | I537772 B | 6/2016 |
| TW | I629615 B | 7/2018 |
| WO | 2014098164 A1 | 6/2014 |

OTHER PUBLICATIONS

Office action of counterpart application by EPO dated Mar. 28, 2022.

* cited by examiner

*Primary Examiner* — Sanjiv D. Patel

(57) ABSTRACT

A cursor controlling method includes: A starting position on which a touch signal triggered by an object on the touch panel is detected, and a starting coordinate of the starting position is calculated; a cursor is display at a first coordinate on a display screen corresponding to the starting coordinate. A first vector of the object moving from the starting position to a first steering position on the touch panel is detected. The cursor is moved along a first moving vector corresponding to the first vector, with a first speed on the display screen, until the object is stopped on a first steering position of the touch panel, to make the cursor ended up at a first virtual position having a first virtual coordinate. The cursor is shifted from the first virtual coordinate to a second coordinate on the display screen and corresponding to the first steering position.

14 Claims, 7 Drawing Sheets

TOUCH-SENSING DISPLAY APPARATUS AND CURSOR CONTROLLING METHOD THEREOF

This application claims the benefit of People's Republic of China application Serial No. 202011324969.6, filed Nov. 24, 2020, the subject matter of which is incorporated herein by reference.

BACKGROUND OF THE DISCLOSURE

Field of the Disclosure

The disclosure relates in general to a display apparatus and the data processing method thereof, and more particularly to a touch-sensing display apparatus and cursor controlling method of its touch panel.

Description of the Related Art

With the advancement of the information electronic technology, in addition to the traditional input devices, such as mice, keyboards, keys, etc., a touch-sensing display apparatus that combines a touch panel (sensor) with a display screen and allows users inputting data by touching the display screen and/or by gestures while watching the display screen has been widely used in portable electronic devices (such as, mobile phones, tablet computers, notebooks, smart watches, etc.).

During the touch operation, the touch-sensing display apparatus must track the start and end positions of the user's touch trace or input gesture on the touch panel. If the user's touch trace or input gesture cannot be correctly tracked, it may cause the touch operation failed. The cursor is a tool used to display the position of the user's current touch or input gesture relative to the display screen. The users can treat the cursor as a pointer to click the cursor to select the data (such as, an icon) at a specific location on the display screen to perform a certain operation, so as to realize a touch input.

In a small-size touch-sensing display apparatus, since the touch panel and the display screen roughly overlap, the actual touch trace or input gesture of a user can be identical to the trace and positions of the cursor image displayed on the display screen, thus the user's actual touch trace or input gesture can be generally synchronized and matched with the trace and positions of the cursor image displayed on the display screen.

However, with the increase in the size of the touch-sensing display apparatus, (such as, a large-scale touch display billboard), the user's operation methods have been changed. For example, mere a sub-touch area disposed in a corner of the display screen is accessible for the user to perform touch operations. The sensing area of the sub-touch area allowing the user performing the touch operations may be much smaller than the display area of the display screen on which the main image is displayed. This makes it difficult for the touch-sensing display apparatus to track the touch trace or input gesture of the user in real time, and further calculation is required to correctly position the start and end points of the touch trace or input gesture of the user corresponding to the trace and positions of the cursor image displayed on the display screen. The mismatch between the touch trace/input gesture of the user and the trace/positions of the cursor may lead display delay of the cursor, and even cause the touch operations failed.

Therefore, there is a need to provide an advanced touch-sensing display apparatus and cursor controlling method of its touch panel to overcome the drawbacks of the prior art.

SUMMARY OF THE DISCLOSURE

One embodiment of the present disclosure provides a cursor controlling method of a touch-sensing display apparatus, wherein the method includes steps as follows: Firstly, a starting position at which a touch signal triggered by an object on a touch panel of the touch-sensing display apparatus is detected, and a starting coordinate of the starting position is calculated; a cursor is displayed at a first coordinate on a display screen of the touch-sensing display apparatus corresponding to the starting coordinate. A first vector of the object moving from the starting position to a first steering position on the touch panel is detected. Next, the cursor is moved along a first moving vector corresponding to the first vector, with a predetermined first speed on the display screen, until the object is stopped on a first steering position of the touch panel, so as to make the cursor ended up on a first virtual position of the display screen having a first virtual coordinate. Subsequently, the cursor is shifted from the first virtual coordinate to a second coordinate on the display screen corresponding to the first steering position.

Another embodiment of the present disclosure provides a touch-sensing display apparatus, wherein the touch-sensing display apparatus includes a display screen, a touch panel, and a control circuit. The touch panel corresponds to the display screen. The control circuit is used to perform the following steps: Firstly, a starting position at which a touch signal triggered by an object on the touch panel is detected, and a starting coordinate of the starting position is calculated; a cursor is display at a first coordinate on the display screen corresponding to the starting coordinate. A first vector of the object moving from the starting position to a first steering position on the touch panel is detected. Next, the cursor is moved along a first moving vector corresponding to the first vector, with a predetermined first speed on the display screen, until the object is stopped on a first steering position of the touch panel, so as to make the cursor ended up on a first virtual position of the display screen having a first virtual coordinate. Subsequently, the cursor is shifted from the first virtual coordinate to a second coordinate on the display screen corresponding to the first steering position.

According to the above embodiments, a touch-sensing display apparatus and a cursor controlling method of its touch panel are disclosed, a starting coordinate on which a touch signal is triggered by an object (for example, the user's fingers or touch control tools) on a touch panel is detected, and a cursor is simultaneously displayed on a coordinate of the display screen corresponding to the starting coordinates. And the moving trace of the cursor can be obtained by a simulation according to the moving vector of the object on the touch panel, and the simulated moving trace of the cursor can be displayed on the display screen in real time. When the movement of the object stops, according to the actual stopping position of the object on the touch panel, simulated moving trace of the cursor can be corrected to shift the cursor to a correct coordinate on the display screen corresponding to the actual stopping position of the touch panel.

Since the moving trace of the object triggering a touch signal on the touch panel and the moving trace of the cursor displayed on the display screen can occur simultaneously, thus the movement of the cursor displayed on the display screen can be synchronous to that of the object manipulated by the user. Such that, the touch operation failure problem of the touch-sensing display apparatus due to the display delay of the cursor can be solved.

BRIEF DESCRIPTION OF THE DRAWINGS

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

The present disclosure provides a touch-sensing display apparatus and a cursor controlling method of its touch panel to solve the problems of touch operation failure due to the display delay of the cursor. The above and other aspects of the disclosure will become better understood by the following detailed description of the preferred but non-limiting embodiment(s). The following description is made with reference to the accompanying drawings:

Several embodiments of the present disclosure are disclosed below with reference to accompanying drawings. However, the structure and contents disclosed in the embodiments are for exemplary and explanatory purposes only, and the scope of protection of the present disclosure is not limited to the embodiments. It should be noted that the present disclosure does not illustrate all possible embodiments, and anyone skilled in the technology field of the disclosure will be able to make suitable modifications or changes based on the specification disclosed below to meet actual needs without breaching the spirit of the disclosure. The present disclosure is applicable to other implementations not disclosed in the specification.

Figure 1:
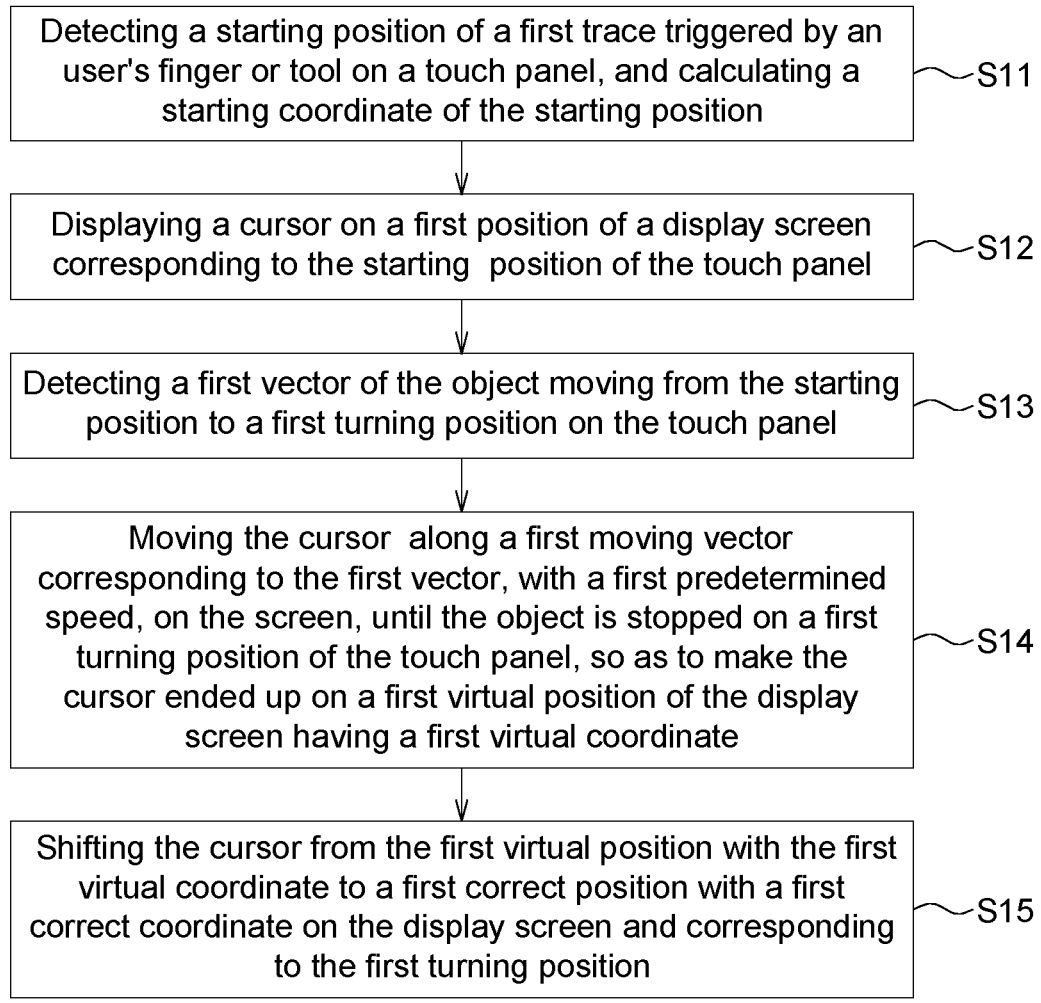
FIG. 1 is a flowchart illustrating a cursor controlling method of a touch-sensing display apparatus according to one embodiment of the present disclosure.

FIG. 1 is a flowchart illustrating a cursor controlling method of a touch-sensing display apparatus according to one embodiment of the present disclosure. In some embodiments of the present disclosure, the cursor controlling method of the touch-sensing display apparatus shown in FIG. 1 can be applied to a touch-sensing display apparatus having a touch panel and a display screen. Wherein, the touch panel and the display screen have a relative position corresponding with each other, and can be combined with each other in a variety of different forms.

FIGS. 2A to 2D are schematic diagrams illustrating several touch operation images using the touch-sensing display apparatus 200 to execute the controlling method shown in FIG. 1 according to one embodiment of the present disclosure. The touch-sensing display apparatus 200 includes a display screen 201, a touch panel 202 and a control circuit 203. Wherein, the touch panel 202 and the display screen 201 have approximately the same size and overlap with each other. The control circuit 203 is electrically connected to the display screen 201 and the touch panel 202 respectively used to perform the touch operation of the touch-sensing display apparatus 200. When the user touches the touch panel 202 with an object 205, such as a finger or a tool, or performs a gesture to trigger the touch panel 202 generating a touch signal, the control circuit 203 can be used to track the moving trace and to position the coordinates of a cursor 204 that is displayed on the display screen 201 and corresponding to the object 205.

In some embodiments of the present disclosure, the touch-sensing display apparatus 200 can be an Add-on touch panel (ATP), wherein the touch panel 202 is an external module directly superposed on the surface of the display screen 201. However, in some other embodiments, the touch-sensing display 200 may be an embedded touch display panel, in which the touch panel 202 is embedded in the display screen 201. For example, in one embodiment, the touch-sensing display apparatus 200 can be an on-cell touch display panel with a touch panel 202 embedded on the upper or lower layer of the color filter substrate (not shown) of the display screen 201. In another embodiment, the touch-sensing display 200 may be an in-cell touch display panel in which the touch panel 202 is embedded in the thin film transistor structure of the liquid-crystal display (LCD) cell of the display screen 201.

The method for controlling the cursor 204 of the touch-sensing display apparatus 200 includes steps as follows: Firstly, referring to step S11 as shown in FIG. 1, a starting position 206 of a touch signal triggered by an object 205, such as the user's finger or tool 205, on the touch panel 202 is detected, and a starting coordinate $(X_0, Y_0)$ of the starting position 206 is calculated. And then referring to step S12 shown in FIG. 1, the cursor 204 is displayed on a first position 207 of the display screen 201 corresponding to the starting position 206 (with the starting coordinates $(X_0, Y_0)$) of the touch panel 202.

Figure 2A:
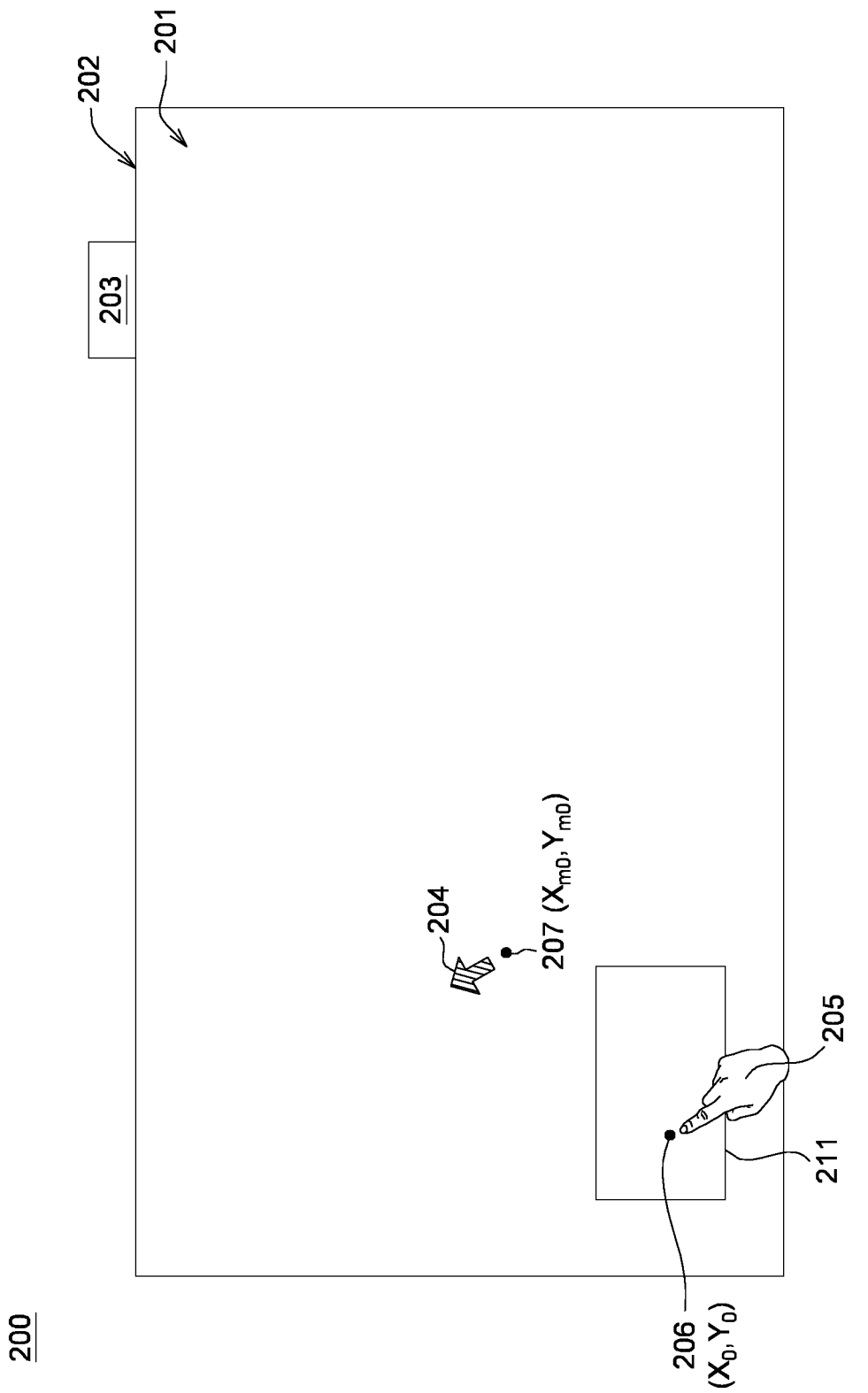
FIGS. 2A to 2D are schematic diagrams illustrating several touch operation images using the touch-sensing display apparatus to execute the controlling method shown in FIG. 1 according to one embodiment of the present disclosure.

In the present embodiment, the touch-sensing display apparatus 200 can be a large-scale touch display billboard. Although the display screen 201 and the touch panel 202 of the touch-sensing display apparatus 200 overlap each other, and touch operation can be performed on each position of the display screen 201, but the size of the display screen 201 and the touch panel 202 is too large for the user to be directly touched or approached. In order to solve the problem, a sub-touch area 211 that has a coordinate system corresponding to the that of the display screen 201 is provided on a corner of the display screen 201 allowing the uses performing touch operations thereof. As shown in FIG. 2A, although the operations of triggering a touch signal and displaying a cursor 204 corresponding to the touch signal are both performed on the display screen 201 (with the touch panel 202), but the starting position 206 of the triggered signal and the first position 207 for displaying the cursor 204 are not located at the same position on the display screen 201.

Wherein, the sub-touch area 211 and the display screen 201 respectively have a plane coordinate system corresponding to each other (for example, these two can be map with each other). That is, for each point in the coordinate system of the sub-touch area 211, a corresponding point can be found in the coordinate system of the display screen 201. For example, the starting coordinates $(X_0, Y_0)$ of the starting position 206 triggered on the touch panel 202 can correspond to the first coordinates $(X_{m0}, Y_{m0})$ of the first position 207 of the display cursor 204 by means of coordinate mapping. And the image of the cursor 204 is displayed on the first coordinate ($X_{m0}$, $Y_{m0}$) of the display screen 201.

Next, referring to step S13 as shown in FIG. 1, a first vector T1 of the object 205 moving from the starting position 206 to a first steering position 208 (with a first steering coordinates ($X_1$, $Y_1$)) on the touch panel 202 is detected. Subsequently, referring to step S14 as shown in FIG. 1, the cursor 204 is moved along a first moving vector Tm1 corresponding to the first vector T1, with a predetermined first speed, on the display screen 201, until the object 205 is stopped on a first steering position 208 of the touch panel 201, so as to make the cursor 204 ended up on a first virtual position 210 of the display screen 201 having a first virtual coordinate ($X_{m1}$, $Y_{m1}$) (referred to as a virtual cursor 204').

In some embodiments of the present disclosure, the step of detecting the first vector T1 includes detecting a measurement coordinate (for example, the first steering coordinates ($X_1$, $Y_1$) of the first steering position 208) of the object 205 after the object 205 changes its position during a period of measuring time. The first vector T1 is determined according to the starting coordinates ($X_0$, $Y_0$) and the measurement coordinates (the first steering coordinates ($X_1$, $Y_1$)). In the present embodiment, the first vector T1 is the coordinate change between the starting coordinates ($X_0$, $Y_0$) and the measured coordinates (the first steering coordinates ($X_1$, $Y_1$)), which can be expressed as ($X_1-X_0$, $Y_1-Y_0$).

Figure 2B:
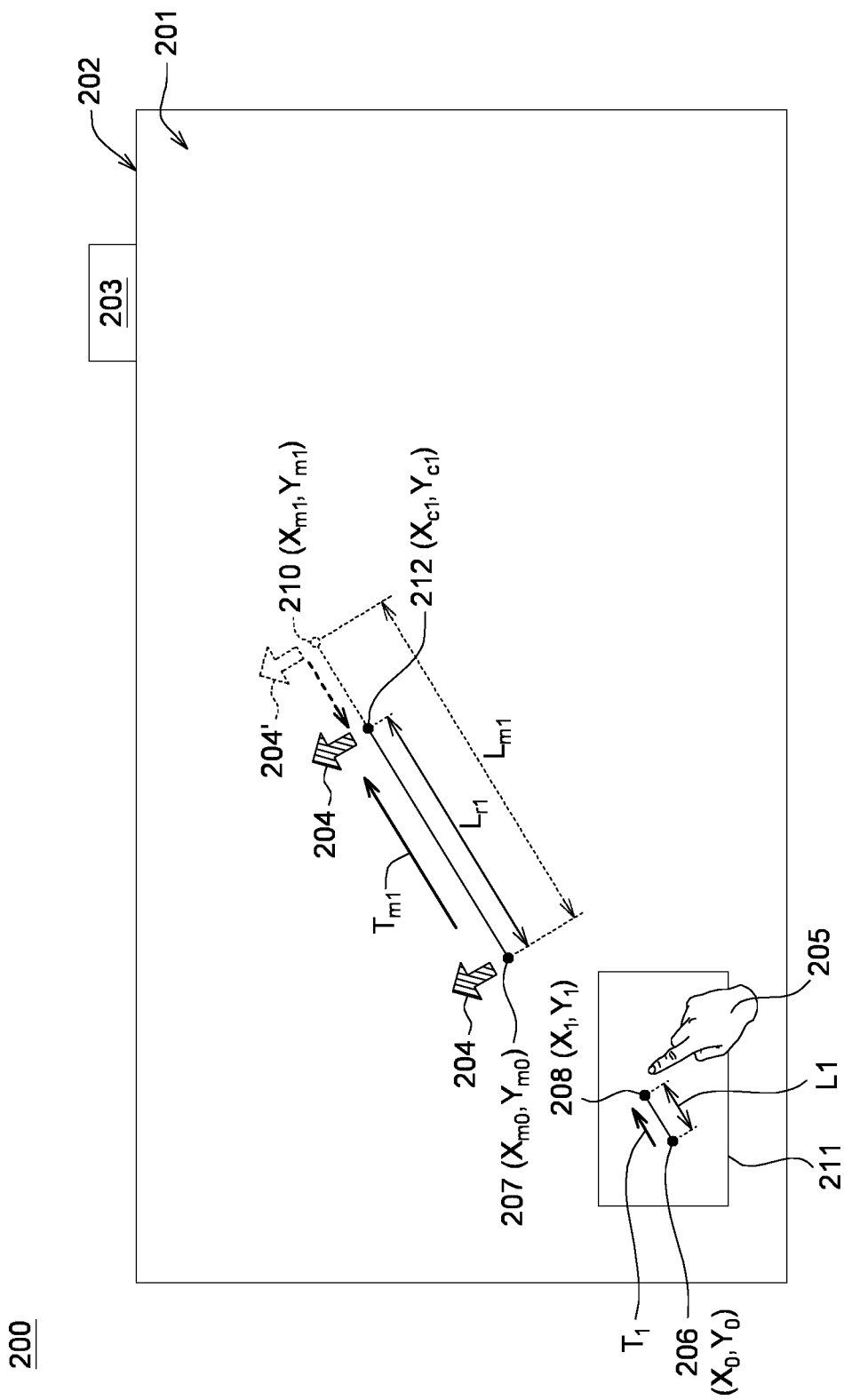
Figure 2C:
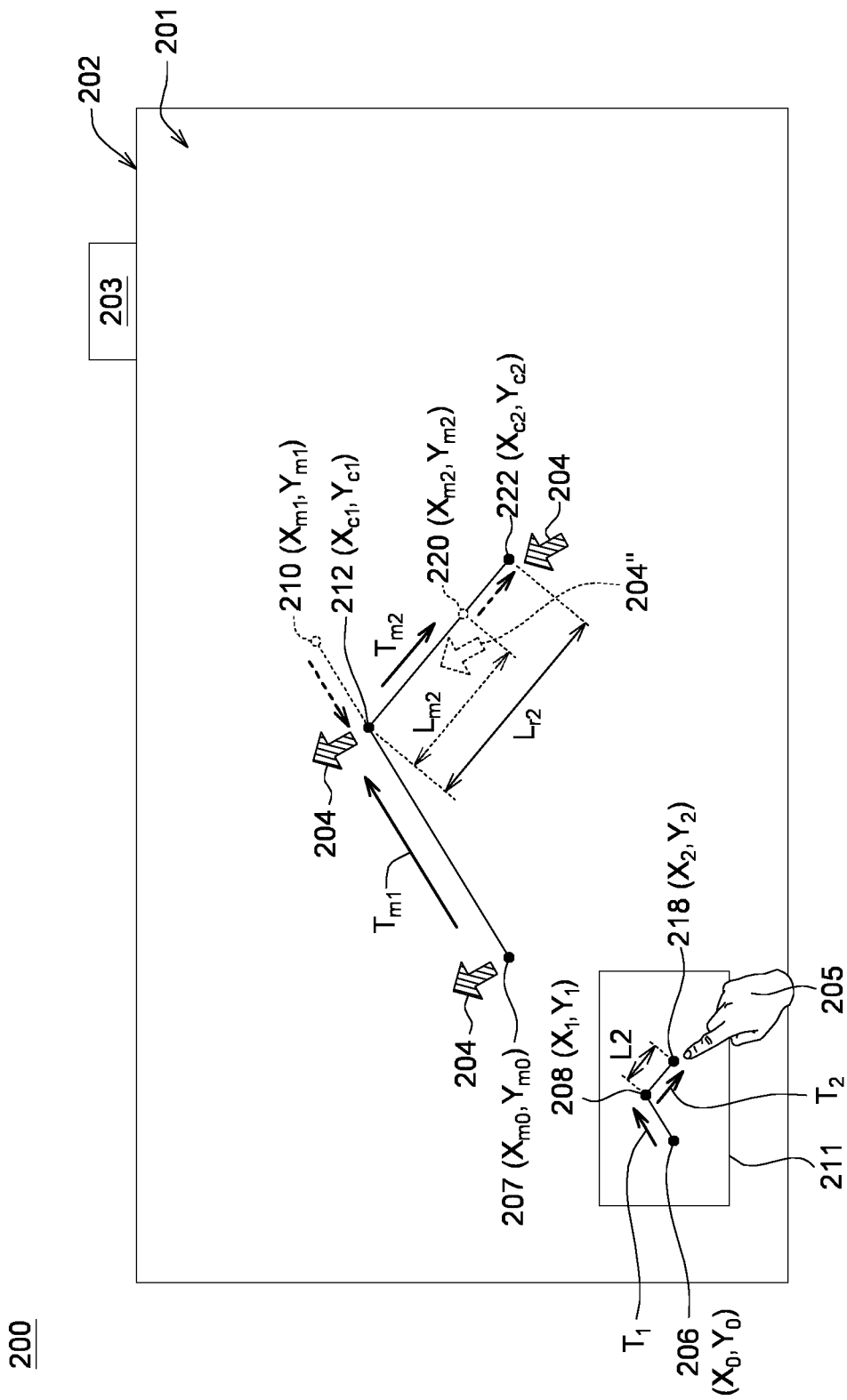

As shown in FIG. 2C, since the predetermined first speed of the cursor 204 moving along the first moving vector Tm1 on the display screen 201 is faster than the speed of the object 205 moving along the first vector T1 on the touch panel 202, thus the ratio of the length Lm1 of the virtual moving trace of which the virtual cursor 204' displayed on the display screen 201 (the distance between the first position 207 and the first virtual position 210) to the length L2 of the moving trace of which the object 205 moves on the touch panel 202 (the distance between the first steering position 208 and the second steering position 218) does not correspond to the ratio of the coordinate scale of the sub-touch area 211 to that of the display screen 201. The normalized length of the virtual moving trace of which the virtual cursor 204' displayed on the display screen 201 (Lm1/coordinate scale of the display screen 201) is greater than the normalized length of the moving trace of which the object 205 moves on the touch panel 202 (L1/the coordinate scale of the sub-touch area 211). In other words, the first virtual position 210 of the display screen 201 on which the virtual cursor 204' is displayed is not the correct position corresponding to the first steering position 208 where the object 205 reaches on the coordinate system of display screen 201.

Subsequently, referring to step S15 as shown in FIG. 1, the virtual cursor 204' is shifted from the first virtual coordinate ($X_{m1}$, $Y_{m1}$) to a first correct position 212 having a first correct coordinate ($X_{c1}$, $Y_{c1}$) on the display screen 201 and corresponding to the first steering position 208. In the present embodiment, since the length Lm1 of the virtual moving trace of which the virtual cursor 204 displayed on the display screen 202 is greater than the real displacement of the cursor 204 on the display screen 201 (the distance between the first position 207 and the first correct position 212) Lr1, thus the cursor 204 must be shifted from the from the first virtual position 210 to the first correct position 212 along the opposite direction of the first moving vector Tm1.

Thereafter, the steps of S12 to S15 can be repeated as the object 205 moves from the first steering position 208 of the touch panel 201 to a second steering position 218 (with a second steering coordinates ($X_2$, $Y_2$)) along a second vector T2 ($X_2-X_1$, $Y_2-Y_1$). And the cursor 204 can be simultaneously shifted along a second moving vector Tm2 corresponding to the second vector T2 with the predetermined first speed previous mentioned or a second speed subsequently adjusted, from the first correct coordinate ($X_{c1}$, $Y_{c1}$) to a second virtual position 220 having a second virtual coordinate ($X_{m2}$, $Y_{m2}$) (referred to as a virtual cursor 204"). Afterwards, the virtual cursor 204" that has been displayed at the second virtual position 220 having the second virtual coordinates ($X_{m2}$, $Y_{m2}$) on the display screen 201 can be corrected to a second correct position 222 having a second correct coordinates ($x_{c2}$, $Y_{c2}$) and corresponding to the second steering position 218.

In some embodiments of the present disclosure, the second speed can be adjusted based on the difference between the length Lm1 of the virtual moving trace of the virtual cursor 204' and the real displacement of the cursor 204 on the display screen 201 (the distance between the first position 207 and the first correct position 212) Lr1. If the difference between these two exceeds a predetermined value, the predetermined first speed can be increased or decreased to the second speed, and the cursor 204 can be moved to the second steering position 218 with the adjusted second speed and displayed on the display screen 201. Alternatively, if the difference between these two does not exceed the predetermined value, the cursor 204 can be moved to the second steering position 218 still with the predetermined first speed and displayed on the display screen 201. In the present embodiment, the speed for moving the cursor 204 can be obtained by slowing down the predetermined first speed to the second predetermined speed, and the cursor 204 can be moved to the second steering position 218 with the adjusted second speed.

As shown in FIG. 2B, since the second speed at which the cursor 204 moves along the second moving vector Tm2 on the display screen 201 is slower than the speed at which the object 205 moves along the second vector T2 on the touch panel 202, thus the ratio of the length Lm2 of the virtual moving trace of which the virtual cursor 204" displayed on the display screen 201 (the distance between the first correct position 212 and a second virtual position 220) to the length L1 of the moving trace of which the object 205 moves on the touch panel 202 (the distance between the starting position 206 to the steering position 208) does not correspond to the ratio of the coordinate scale of the sub-touch area 211 to that of the display screen 201. The normalized length of the virtual moving trace of which the virtual cursor 204" displayed on the display screen 201 (Lm2/coordinate scale of the display screen 201) is smaller than the normalized length of the moving trace of which the object 205 moves on the touch panel 202 (L2/the coordinate scale of the sub-touch area 211).

In other words, the length Lm2 of the virtual moving trace of which the virtual cursor 204" displayed on the display screen 201 (the distance between the starting position 206 to the steering position 208) is smaller than the real displacement of the cursor 204 (the distance between the first correct position 212 and the second correct position 222) Lr2. Therefore, the virtual cursor 204" must be moved forward from the second virtual position 220 to the second correct position 212 along the second moving vector Tm2.

Figure 2D:
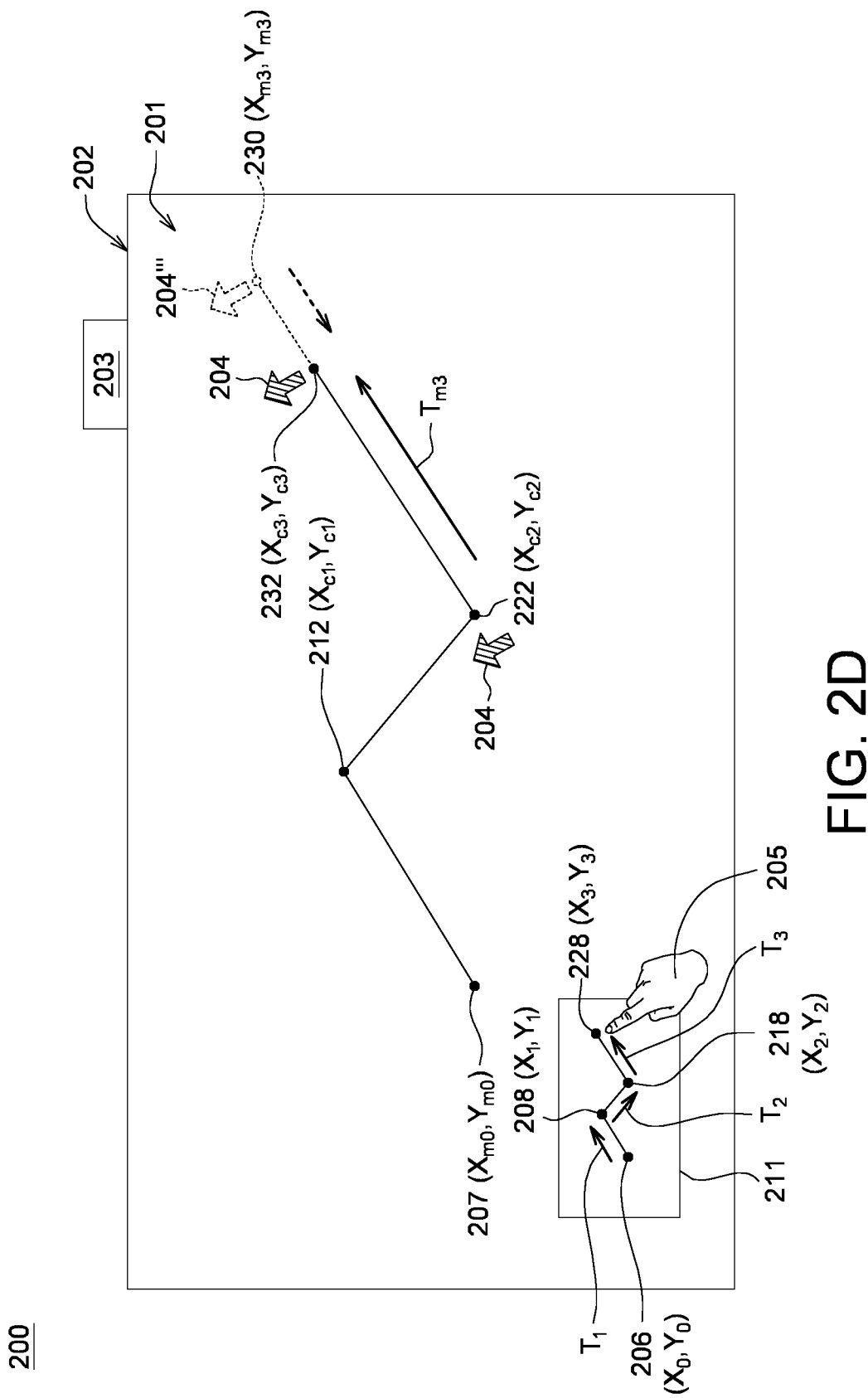

As shown in FIG. 2D, the steps of S12 to S15 can be repeated as the object 205 moves from the second steering position 218 of the touch panel 201 to a third steering position 228 (with a second steering coordinates ($X_3$, $Y_3$))

along a third vector T3 ($X_3-X_2$, $Y_3-Y_2$). And the cursor 204 can be simultaneously shifted along a third moving vector Tm3 corresponding to the third vector T3 with the second speed previous mentioned or a third speed subsequently adjusted, from the second correct position 222 having the second correct coordinates ($X_{c2}$, $Y_{c2}$) to a third virtual position 230 having a third virtual coordinate ($X_{m3}$, $Y_{m3}$) (referred to as a virtual cursor 204'''). Afterwards, the virtual cursor 204''' that has been displayed at the third virtual position 230 having a third virtual coordinate ($X_{m3}$, $Y_{m3}$) on the display screen 201 can be corrected to a third correct position 232 having a third correct coordinates ($X_{c3}$, $Y_{c3}$) and corresponding to the third steering position 228.

In one embodiment of the present disclosure, the method for adjusting the third speed may be the same as that for adjusting the second speed, and thus will not be repeated here. In another embodiment of the present disclosure, the third speed may be obtained by calculating the average value of the first speed and the second speed.

After the user moves the cursor 204 to the selected position (for example, the third correct position 232) on the display screen 201 in the aforementioned manner, the user can click the cursor 204 to input instructions to program the data corresponding to the icon displayed on the selected position.

Figure 3:
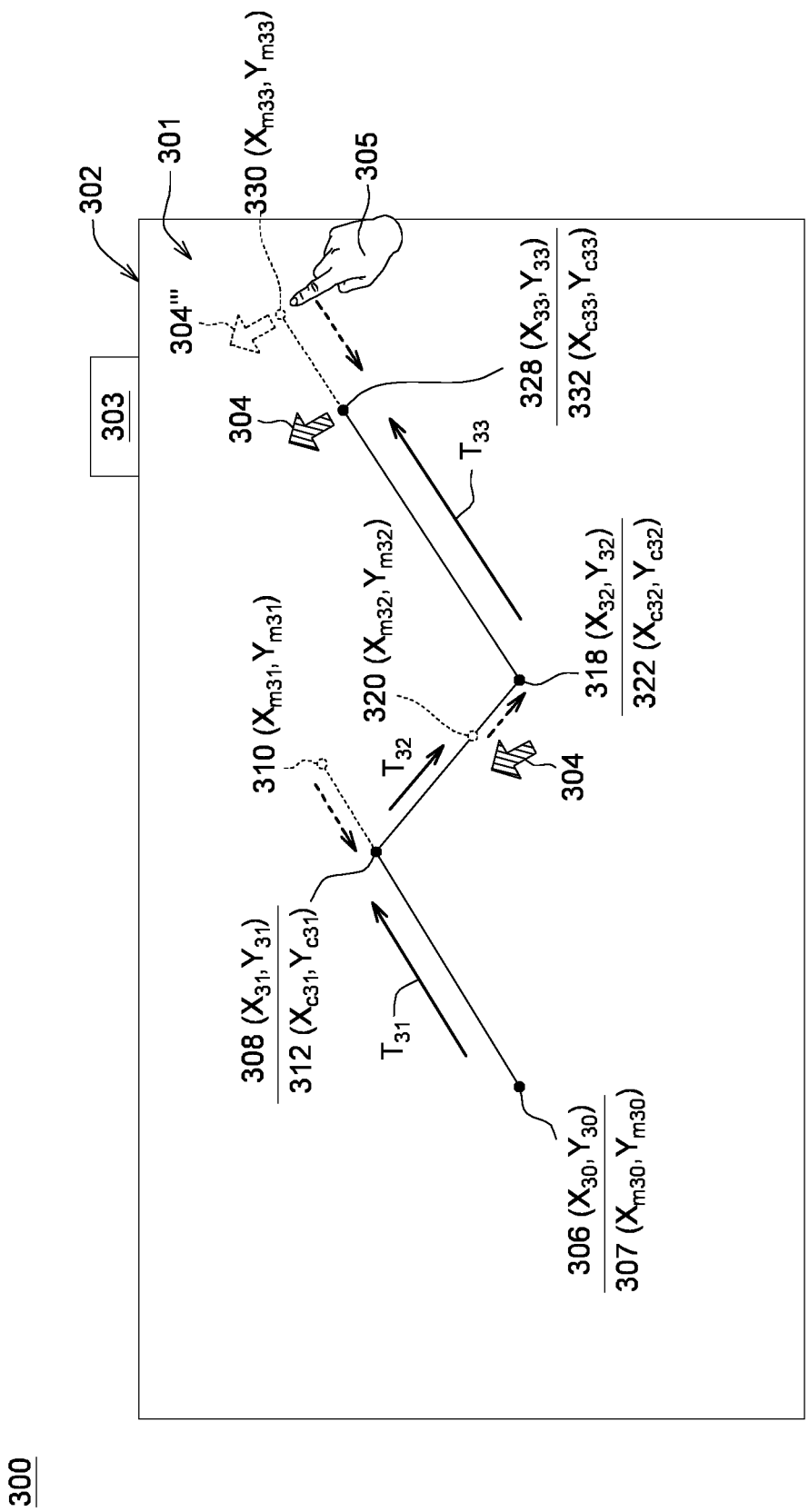
FIG. 3 is a schematic diagram illustrating a touch operation image using another touch-sensing display apparatus to execute the controlling method shown in FIG. 1 according to another embodiment of the present disclosure.

However, it should be appreciated that the touch-sensing display apparatus suitable for the cursor controlling method shown in FIG. 1 is not limited to this regard. FIG. 3 is a schematic diagram illustrating a touch operation image using another touch-sensing display apparatus 300 to execute the controlling method shown in FIG. 1 according to another embodiment of the present disclosure. The structure and operation method of the touch display device 300 are similar to those of the touch-sensing display apparatus 200. The main difference is that the size of the touch-sensing display apparatus 300 and that of the touch-sensing display apparatus 200 are different, which results in different ways of controlling touch operations.

In the present embodiment, touch-sensing display apparatus 300 can be, for example, a touch display device built in a portable electronic apparatus (e.g., a mobile phone, a tablet computer, a notebook computer, a smart watch etc.). Since the display screen 301 and the touch panel 302 overlap each other, and the size allows the user's finger or tool (object 305) to directly touch each corner of the display screen 301, thus the user can perform touch operations at various positions on the display screen 301, instead of performing touch operations on a sub-touch area at a corner of the display screen 301.

In other words, the starting coordinates ($X_{30}$, $Y_{30}$) of the starting position 306, the first steering coordinates ($X_{30}$, $Y_{30}$) of the first steering position 308, the second steering coordinates ($X_{32}$, $Y_{32}$) of the second steering position 318 and the third steering coordinates ($X_{33}$, $Y_{33}$) of the third steering position 328, at which the touch signals are triggered by the user's finger or the tool (object 305) on the touch panel 302 respectively overlap with the first coordinate ($X_{m30}$, $Y_{m30}$) of the first position 307, the first correct coordinate ($X_{c31}$, $Y_{c31}$) of the first correct position 312, the second correct coordinate ($X_{c32}$, $Y_{c32}$) of the second correct position 322 and the third correct coordinates ($X_{c33}$, $Y_{c33}$) of the third correct position, at which the cursor 304 are correspondingly displayed on the display screen 301.

At the same time, the moving trace of the cursor 304 can be synchronously displayed on the display screen 301 by the control circuit 303 applying the method shown in FIGS. 2A to 2D to match the moving trace of the finger or the tool (object 305) (e.g., the first vector T31, the second vector T32, and the third vector T33). And the moving trace of the virtual cursor 304''' that moves along the first vector T31, the second vector T32 and the third vector T33 with speeds faster (or slower) than the moving speeds of the finger or the tool (object 305) can be respectively corrected from the first virtual coordinates ($X_{m31}$, $Y_{m31}$) of the first virtual position 310 to the first correct coordinates ($X_{c31}$, $Y_{c31}$) of the first correct position 312; from the second virtual coordinates ($X_{m32}$, $Y_{m32}$) of the second virtual position 320 to the second correct coordinates ($X_{c32}$, $Y_{c32}$) of the second correct position 322; and from the third virtual coordinates ($X_{m33}$, $Y_{m33}$) of the third virtual position 330 to the third correct coordinates ($X_{c33}$, $Y_{c33}$) of the third correct position 332.

After the user moves the cursor 304 to the selected position (for example, the third correct position 332) on the display screen 301 in the aforementioned manner, the user can click the cursor 304 to input instructions to program the data corresponding to the icon displayed on the selected position.

Figure 4:
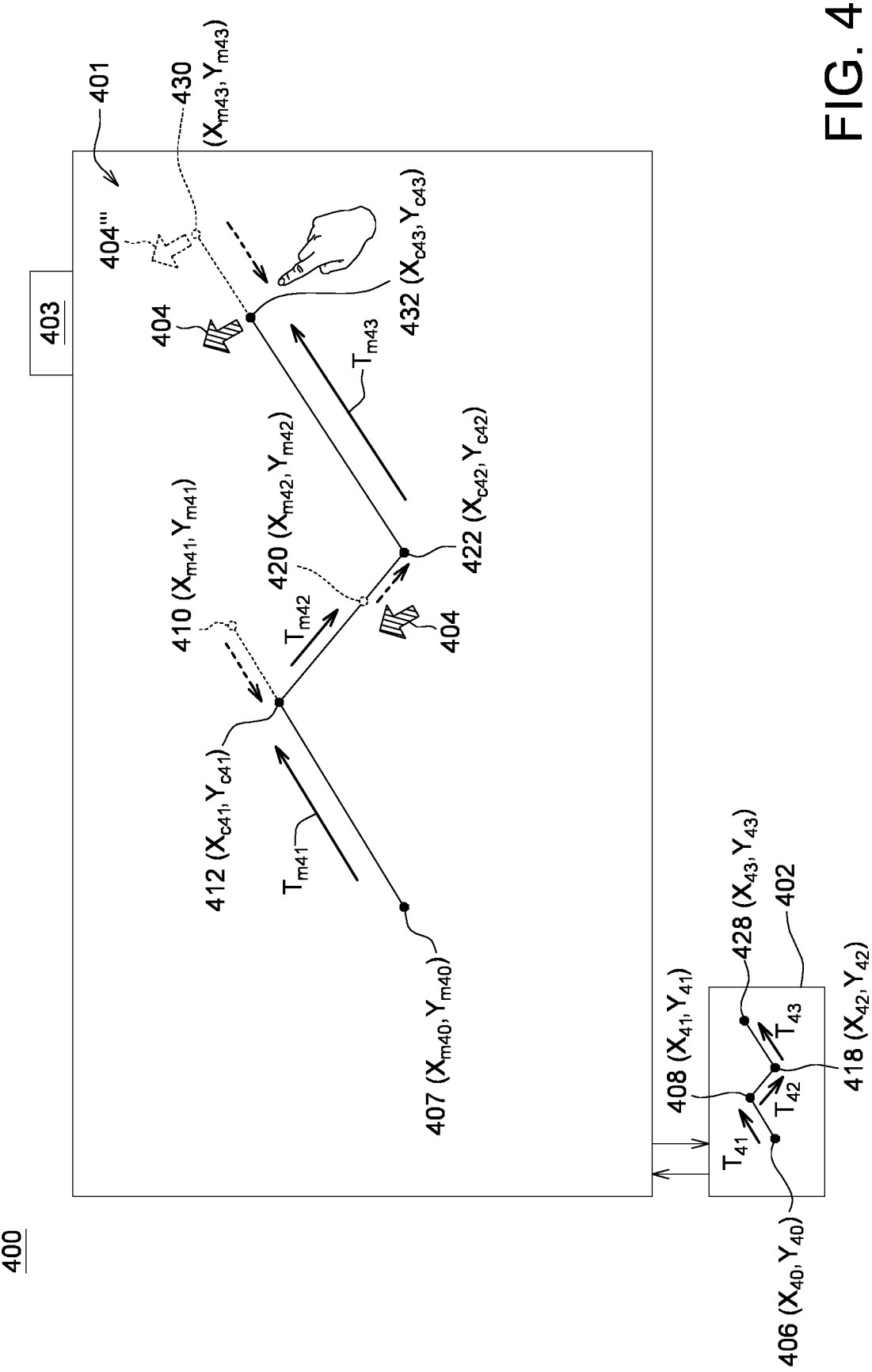
FIG. 4 is a schematic diagram illustrating a touch operation image using yet another touch-sensing display apparatus to execute the controlling method shown in FIG. 1 according to yet another embodiment of the present disclosure.

FIG. 4 is a schematic diagram illustrating a touch operation image using yet another touch-sensing display apparatus 400 to execute the controlling method shown in FIG. 1 according to yet another embodiment of the present disclosure. The structure and operation method of the touch-sensing display apparatus 400 are substantially similar to those of the touch-sensing display apparatus 200. The main difference is that the touch panel 401 and the display screen 401 of the touch-sensing display apparatus 400 can be separated from each other, and the two can be electrically connected. For example, the touch-sensing display apparatus 400 may be a combination of a notebook computer without a touch function and a touch panel 401 provided around the keyboard. In still other embodiments of the present disclosure, the touch panel 402 and the display screen 401 of the touch-sensing display apparatus 400 can be separated from each other, and there is no electrical connection between these two; the touch panel 402 and the display screen 401 are electromagnetically or photoelectrically connected to each other.

When the user triggers touch signals at the starting position 406 (with the starting coordinates ($X_{40}$, $Y_{40}$)) on the touch panel 401 with a finger or a tool (object 405), and then, in sequence, moves along the first vector T41 to the first steering coordinates ($X_{41}$, $Y_{41}$) of the first steering position 408, moves along the second vector T42 to the second steering coordinates ($X_{42}$, $Y_{42}$) of the second steering position 418, and moves along the third vector T43 to the third steering coordinates ($X_{43}$, $Y_{43}$) of the third steering position 428, the moving trace of the cursor 404 can be simultaneously displayed on the display screen 401 by the control circuit 403 applying the method shown in FIGS. 2A to 2D to match the moving trace of the finger or the tool (object 405) (e.g., the first vector T41, the second vector T42, and the third vector T43). Wherein the cursor 404, in sequence, moves along the first moving vector Tm41 to the virtual coordinate ($X_{m41}$, $Y_{m41}$) of the first vector T41; moves along the second moving vector Tm42 and the third moving vector Tm43 corresponding, the second vector T42 to the second virtual coordinate ($X_{m42}$, $Y_{m42}$) of the second virtual position 420; and moves along the third vector T43 to the third virtual coordinate ($X_{m43}$, $Y_{m43}$) of the third virtual position 430. And the moving trace of the virtual cursor 404''' that moves along the first moving vector Tm41, the second moving vector Tm42, and the third moving vector Tm43 that respectively correspond to the first vector T41, the second vector T42 and the third vector T43 with speeds faster (or slower) than the moving speeds of the finger or the tool (object 405) can be respectively corrected from the first virtual coordinates ($X_{m41}$, $Y_{m41}$) of the first virtual position 410 to the first correct coordinates ($X_{c41}$, $Y_{c41}$) of the first correct position 412; from the second virtual coordinates ($X_{m42}$, $Y_{m42}$) of the second virtual position 420 to the second correct coordinates ($X_{c42}$, $Y_{c42}$) of the second correct position 422; and from the third virtual coordinates ($X_{m43}$, $Y_{m43}$) of the third virtual position 430 to the third correct coordinates ($X_{c43}$, $Y_{c43}$) of the third correct position 432.

After the user moves the cursor 404 to the selected position (for example, the third correct position 432) on the display screen 401 in the aforementioned manner, the user can click the cursor 404 to input instructions to program the data corresponding to the icon displayed on the selected position.

According to the above embodiments, a touch-sensing display apparatus and a cursor controlling method of its touch panel are disclosed, a start coordinate on which a touch signal is triggered by an object (for example, the user's fingers or touch control tools) on a touch panel is detected, and a cursor is simultaneously displayed on a coordinate of the display screen corresponding to the start coordinates. And the moving trace of the cursor can be obtained by a simulation according to the moving vector of the object on the touch panel, and the simulated moving trace of the cursor can be displayed on the display screen in real time. When the movement of the object stops, according to the actual stopping position of the object on the touch panel, simulated moving trace of the cursor can be corrected to shift the cursor to a correct coordinate on the display screen corresponding to the actual stopping position of the touch panel.

Since the moving trace of the object triggering a touch signal on the touch panel and the moving trace of the cursor displayed on the display screen can occur simultaneously, thus the movement of the cursor displayed on the display screen can be synchronous to that of the object manipulated by the user. Such that, the touch operation failure problem of the touch-sensing display apparatus due to the display delay of the cursor can be solved.

While the disclosure has been described by way of example and in terms of the preferred embodiment (s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A cursor controlling method of a touch-sensing display apparatus, comprising:
   detecting a starting position at which a touch signal triggered by an object on a touch panel of the touch-sensing display apparatus;
   calculating a starting coordinate of the starting position;
   displaying a cursor at a first coordinate on a display screen of the touch-sensing display apparatus corresponding to the starting coordinate;
   detecting a first vector of the object moving from the starting position to a first steering position on the touch panel;
   moving the cursor along a first moving vector corresponding to the first vector, with a predetermined first speed on the display screen, until the object is stopped at a first steering position on the touch panel, so as to make the cursor ended up at a first virtual position on the display screen having a first virtual coordinate;
   shifting the cursor from the first virtual coordinate to a first correct coordinate of the display screen corresponding to the first steering position, wherein a first distance between the first coordinate and the first correct coordinate is less than a virtual distance between the first coordinate and the first virtual coordinate;
   detecting a second vector of the object moves from the first steering position to a second steering position on the touch panel;
   moving the cursor along a second moving vector corresponding to the second vector on the display screen, with a second speed until the object is stopped at a second steering position, so as to make the cursor ended up at a second virtual coordinate on the display screen; and
   shifting the cursor from the second virtual coordinate to a second correct coordinate of the display screen corresponding to the second steering position, wherein the second speed is adjusted by a difference between the first distance and the virtual distance.

2. A cursor controlling method of a touch-sensing display apparatus, comprising:
   detecting a starting position at which a touch signal triggered by an object on a touch panel of the touch-sensing display apparatus;
   calculating a starting coordinate of the starting position;
   displaying a cursor at a first coordinate on a display screen of the touch-sensing display apparatus corresponding to the starting coordinate;
   detecting a first vector of the object moving from the starting position to a first steering position on the touch panel;
   moving the cursor along a first moving vector corresponding to the first vector, with a predetermined first speed on the display screen, until the object is stopped at a first steering position on the touch panel, so as to make the cursor ended up at a first virtual position on the display screen having a first virtual coordinate;
   shifting the cursor from the first virtual coordinate to a first correct coordinate of the display screen corresponding to the first steering position, wherein a first distance between the first coordinate and the first correct coordinate is less than a virtual distance between the first coordinate and the first virtual coordinate;
   detecting a second vector of the object moves from the first steering position to a second steering position on the touch panel;
   moving the cursor along a second moving vector corresponding to the second vector on the display screen, with a second speed until the object is stopped at a second steering position, so as to make the cursor ended up at a second virtual coordinate on the display screen;
   shifting the cursor from the second virtual coordinate to a second correct coordinate of the display screen corresponding to the second steering position; and
   obtaining a third speed for moving the cursor from the second correct coordinate to a third virtual coordinate on the display screen according to an average value of the predetermined first speed and the second speed.

3. The cursor controlling method according to claim 1, wherein a real distance between the first coordinate and the first correct coordinate is greater than a virtual distance between the first coordinate and the first virtual coordinate.

4. The cursor controlling method according to claim 1, wherein the step of displaying the cursor at the first coordinate on the display screen comprises:
   mapping the starting coordinate of the touch panel to the first coordinate on the display screen; and
   displaying an image of the cursor on the first coordinate.

5. The cursor controlling method according to claim 1, wherein the step of detecting the first vector comprises:
   detecting a measurement coordinate of the first steering position of the object during a period of measuring time; and
   determining the first vector according to the starting coordinate and the measured coordinate.

6. A touch-sensing display apparatus, comprising:
   a display screen;
   a touch panel, corresponding to the display screen; and
   a control circuit, for performing steps comprising:
   detecting a starting position at which a touch signal triggered by an object on the touch panel;
   calculating a starting coordinate of the starting position;
   displaying a cursor at a first coordinate on the display screen corresponding to the starting coordinate;
   detecting a first vector of the object moving from the starting position to a first steering position on the touch panel;
   moving the cursor along a first moving vector corresponding to the first vector, with a predetermined first speed on the display screen, until the object is stopped at a first steering position on the touch panel, so as to make the cursor ended up at a first virtual position on the display screen having a first virtual coordinate;
   shifting the cursor from the first virtual coordinate to a first correct coordinate of the display screen corresponding to the first steering position, wherein a real distance between the first coordinate and the first correct coordinate is less than a virtual distance between the first coordinate and the first virtual coordinate;
   detecting a second vector of the object moves from the first steering position to a second steering position on the touch panel;
   moving the cursor along a second moving vector corresponding to the second vector on the display screen, with a second speed until the object is stopped at a second steering position, so as to make the cursor ended up at a second virtual coordinate on the display screen; and
   shifting the cursor from the second virtual coordinate to a second correct coordinate of the display screen corresponding to the second steering position, wherein the second speed is adjusted by a difference between the first distance and the virtual distance.

7. A touch-sensing display apparatus, comprising:
   a display screen;
   a touch panel, corresponding to the display screen; and
   a control circuit, for performing steps comprising:
   detecting a starting position at which a touch signal triggered by an object on the touch panel;
   calculating a starting coordinate of the starting position;
   displaying a cursor at a first coordinate on the display screen corresponding to the starting coordinate;
   detecting a first vector of the object moving from the starting position to a first steering position on the touch panel;
   moving the cursor along a first moving vector corresponding to the first vector, with a predetermined first speed on the display screen, until the object is stopped at a first steering position on the touch panel, so as to make the cursor ended up at a first virtual position on the display screen having a first virtual coordinate;
   shifting the cursor from the first virtual coordinate to a first correct coordinate of the display screen corresponding to the first steering position, wherein a real distance between the first coordinate and the first correct coordinate is less than a virtual distance between the first coordinate and the first virtual coordinate;
   detecting a second vector of the object moves from the first steering position to a second steering position on the touch panel;
   moving the cursor along a second moving vector corresponding to the second vector on the display screen, with a second speed until the object is stopped at a second steering position, so as to make the cursor ended up at a second virtual coordinate on the display screen; and
   shifting the cursor from the second virtual coordinate to a second correct coordinate of the display screen corresponding to the second steering position, wherein the control circuit further performing a step of obtaining a third speed for moving the cursor from the second correct coordinate to a third virtual coordinate on the display screen according to an average value of the predetermined first speed and the second speed.

8. The touch-sensing display apparatus according to claim 6, wherein a real distance between the first coordinate and the first correct coordinate is greater than a virtual distance between the first coordinate and the first virtual coordinate.

9. The touch-sensing display apparatus according to claim 6, wherein the step of displaying the cursor at the first coordinate on the display screen comprises:
   mapping the starting coordinate of the touch panel to the first coordinate on the display screen; and
   displaying an image of the cursor on the first coordinate.

10. The touch-sensing display apparatus according to claim 6, wherein the display screen and the touch panel overlap each other, the display screen has a sub-touch area having a size smaller than that of the display screen, and sub-touch area has a first coordinate system mapped to that of the display screen.

11. The touch-sensing display apparatus according to claim 10, wherein the display screen has a coordinate system identical with the first coordinate system of the sub-touch area.

12. The touch-sensing display apparatus according to claim 10, wherein a length of a virtual moving trace of which the cursor displayed on the display screen is greater then a length of a moving trace of which the object moving on the touch panel.

13. The touch-sensing display apparatus according to claim 6, wherein the display screen and the touch panel are separated from each other; and the touch panel and the display screen are electromagnetically or photoelectrically connected to each other.

14. The touch-sensing display apparatus according to claim 6, wherein the step of detecting the first vector comprises:
   detecting a measurement coordinate of the first steering position of the object during a period of measuring time; and
   determining the first vector according to the starting coordinate and the measured coordinate.

* * * * *